(12) United States Patent
Ganti et al.

(10) Patent No.: US 10,901,770 B2
(45) Date of Patent: Jan. 26, 2021

(54) MANAGEMENT OF VIRTUAL MACHINE HEALTH USING DUAL DATABASES

(71) Applicant: International Business Machines Corporation, Armonk, NY (US)

(72) Inventors: Veena Ganti, Austin, TX (US); Rui Yang, Austin, TX (US); Lakshmi Yadlapati, Austin, TX (US); James Pafumi, Leander, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

(21) Appl. No.: 16/185,395

(22) Filed: Nov. 9, 2018

(65) Prior Publication Data

US 2020/0150991 A1 May 14, 2020

(51) Int. Cl.
*G06F 11/00* (2006.01)
*G06F 9/455* (2018.01)
*G06F 11/20* (2006.01)
*G06F 16/23* (2019.01)

(52) U.S. Cl.
CPC ...... *G06F 9/45558* (2013.01); *G06F 11/2094* (2013.01); *G06F 16/2379* (2019.01); *G06F 2009/45579* (2013.01); *G06F 2009/45591* (2013.01); *G06F 2201/82* (2013.01)

(58) Field of Classification Search
CPC ............ G06F 9/45558; G06F 11/2094; G06F 16/2379
See application file for complete search history.

(56) References Cited

U.S. PATENT DOCUMENTS

| | | | | |
|---|---|---|---|---|
| 2012/0180070 A1* | 7/2012 | Pafumi | .................. | G06F 9/542 719/313 |
| 2012/0246642 A1* | 9/2012 | Pafumi | ..................... | G06F 8/63 718/1 |
| 2015/0278129 A1* | 10/2015 | Keeriyadath | ........... | G06F 13/18 710/41 |

* cited by examiner

*Primary Examiner* — Joshua P Lottich
(74) *Attorney, Agent, or Firm* — Cantor Colburn LLP; David Quinn

(57) ABSTRACT

A system includes a plurality of virtual machines (VMs), a shared storage pool (SSP) configured to store health information for the plurality of VMs, and a plurality of virtual input/output servers (VIOSs) participating in the shared storage pool (SSP). Each VIOS is associated with a respective group of VMs of the plurality of VMs and is configured to receive health data for each VM of the respective group of VMs. The system also includes a health information database associated with each VIOS of the plurality of VIOSs, the health information database configured to store a subset of the health data for each VM of the respective group of VMs. Each VIOS is configured to transmit the health data for each VM of the respective group of VM to the SSP, and in parallel, store the subset of the health data in the health information database.

20 Claims, 3 Drawing Sheets

MANAGEMENT OF VIRTUAL MACHINE HEALTH USING DUAL DATABASES

BACKGROUND

The present invention relates to virtual machines and, more specifically, to using multiple databases to manage the health of virtual machines.

A virtual machine (VM) is an emulation of a computer system, and generally multiple VMs can run on a host machine, such as a server. The host machine uses a hypervisor to manage the virtual machines, each of which may be a logical partition of the host machine. A virtual input/output server (VIOS), which is a specialized logical partition, manages physical input resources and output resources among VMs with which the VIOS is connected.

One or more VIOSs can participate in a shared storage pool (SSP). The SSP is a pool of storage area network (SAN) storage devices that can be used among the VIOSs and is useful in improving the use of available storage, simplifying administrative tasks and simplifying the aggregation of storage devices for use by VMs.

SUMMARY

According to one embodiment, a system includes a plurality of virtual machines (VMs), a shared storage pool (SSP) configured to store health information for the plurality of VMs, and a plurality of virtual input/output servers (VIOSs) participating in the shared storage pool (SSP). Each VIOS is associated with a respective group of VMs of the plurality of VMs and is configured to receive health data for each VM of the respective group of VMs. The system also includes a health information database associated with each VIOS of the plurality of VIOSs, the health information database configured to store a subset of the health data for each VM of the respective group of VMs. Each VIOS is configured to transmit the health data for each VM of the respective group of VM to the SSP, and in parallel, store the subset of the health data in the health information database.

According to one embodiment, a method of managing a shared storage environment includes monitoring the shared storage environment, the shared storage environment including a plurality of virtual machines (VMs), a shared storage pool (SSP) configured to store health information for the plurality of VMs, and a plurality of virtual input/output servers (VIOSs) participating in the shared storage pool (SSP), where each VIOS is associated with a respective group of VMs of the plurality of VMs. The method also includes receiving health data for each VM of the respective group of VMs, transmitting the health data for each VM of the respective group of VM to the SSP, and in parallel, storing a subset of the health data for each VM of the respective group of VMs in a health information database, the health information database associated with each VIOS of the plurality of VIOSs.

According to one embodiment, a computer program product includes a computer readable storage medium having program instructions embodied therewith, the program instructions executable by a processing system to perform a method that includes monitoring a shared storage environment. The shared storage environment includes a plurality of virtual machines (VMs), a shared storage pool (SSP) configured to store health information for the plurality of VMs, and a plurality of virtual input/output servers (VIOSs) participating in the shared storage pool (SSP), where each VIOS is associated with a respective group of VMs of the plurality of VMs. The method also includes receiving health data for each VM of the respective group of VMs, transmitting the health data for each VM of the respective group of VM to the SSP, and in parallel, storing a subset of the health data for each VM of the respective group of VMs in a health information database, the health information database associated with each VIOS of the plurality of VIOSs.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Systems, methods and computer program products are provided for monitoring and recovering health information in a computing system having shared storage. An embodiment of the computing system includes one or more groups of virtual machines (VMs). Each group of VMs is managed by a virtual input/output server (VIOS) and is connected to a shared storage pool (SSP) that stores data and information including health information for each VM. An orchestration node is connected to the SSP and manages the collection of health information for each VM and the storage of the health information in the SSP.

In one embodiment, each VIOS includes or otherwise has access to a supplemental database. The supplemental database associated with a VIOS allows for storing health information associated with each VM in the VM group managed by the VIOS. The supplemental database may be a local database that resides in each VIOS. The supplemental database for a given VIOS stores all or a portion of the health data that is transmitted by the given VIOS to the SSP, and the health data stored in the supplemental database can be accessed by the orchestration node by querying the given VIOS. The stored health data may be stored in a table and/or in a copy of a portion of a catalog maintained in the SSP.

Embodiments described herein provide a number of advantages and technical effects. For example, the embodiments provide a quick and efficient way to recover health information stored in the SSP in the event that all or part of the SSP fails, or that at least part of the health information in the SSP becomes unavailable. The embodiments ensure that the orchestration node is continuously aware of the health of each VM and allow the orchestration node to make informed policy decisions in the event of a failure. The embodiments also provide a method to quickly recover and/or synch-up the VMs by utilizing the supplemental database associated with each VIOS.

Figure 1:
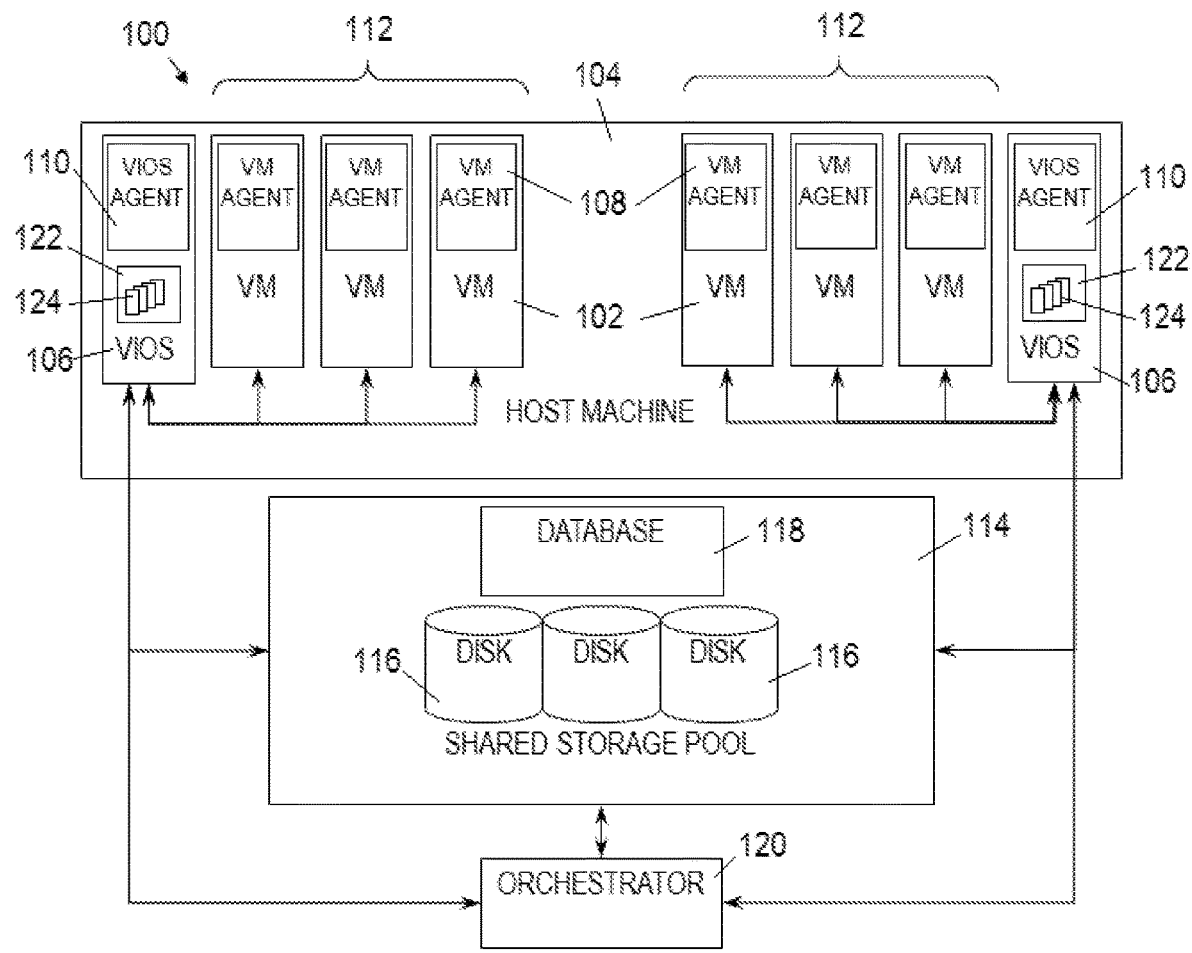
FIG. 1 depicts a shared storage computing system according to one or more embodiments of the present invention.

FIG. 1 shows an embodiment of a shared storage computing system 100, which includes a plurality of VMs 102. Each VM 102 may be a logical partition (LPAR) or another form of a virtual machine. The various VMs 102 may run on one or more host machines. For example, the VMs 102 are shown as running on a server 104. It is noted that the system 100 may include multiple servers 104 or other host machines.

The system 100 also includes a plurality of VIOSs 106, also referred to as VIOS partitions. A VIOS is a specialized logical partition that manages I/O resources for one or more VMs 102 running on the same server 104 or other host machine. Each VIOS 106 can be considered a VIOS node and each VM 102 can be considered a VM node.

In some embodiments, each VM 102 includes a VM agent 108, and each VIOS 106 includes a VIOS agent 110. In some embodiments of the invention, a VM agent 108 is a daemon running in a respective VM 102, and a VIOS agent 110 is a daemon running in a respective VIOS 106. Alternatively, a VM agent 108 may be incorporated into the code of the VM 102, and a VIOS agent 110 may be incorporated into the code of the VIOS 106. Generally, each VM agent 108 may be in communication with the VIOS agent 110 of its associated VIOS 106, which manages the I/O resources for that VM 102. Each VIOS agent 110 may be able to communicate with respective VM agents 108 through an API for VIOS-VM communications. Generally, activities described herein as being performed by a VIOS 106 may be performed by the respective VIOS agent 110, and activities described herein as being performed by a VM 102 may be performed by the respective VM agent 108.

In one embodiment, each VIOS 106 is assigned to monitor the health of a respective group of VMs 102, which is referred to herein as a VM group 112. For a given VM group 112, the VIOS 106 assigned to the VM group 112 queries the health of each VM 102 in the VM group 112 by retrieving health information for each VM 102. The health information is stored in a shared storage system such as a shared storage pool (SSP) 114.

In one embodiment, the SSP 114 is a global distributed database that is accessible by all of the VIOSs 106 in the system 100, and includes various storage devices that are usable by the various VIOSs 106. For example, the SSP 114 includes one or more disks 116 or portions thereof, and a database 118, referred to as an SSP database 118. The SSP database 118 may be used for various purposes, such as those related to management of allocation of the disks 116. The SSP database 118 may be stored on one or more of the disks 116. For example, the SSP database 118 may be redundantly stored on each disk 116 or distributed across the disks 116. The SSP database 118 may be a relational database or various other storage objects capable of maintaining data as described herein, and is not limited to the configuration shown in FIG. 1.

The system also includes a specialized node, referred to herein as an orchestration node or orchestrator 120, that manages the collection of health information from the VMs 102, and the storage of such information in the SSP 114. The orchestrator 120 may also be responsible for some or all aspects of disaster recovery.

The orchestrator 120 communicates with the SSP 114 as needed to store or access health information. The orchestrator 120 may reside on the server 104 or other device in the system, e.g., as a VIOS. In some embodiments, the orchestrator 120 is remote from the SSP 114. For example, the orchestrator 120 may be incorporated into a management system on a remote server. The orchestrator 120 may be hardware, software, or a combination of both.

Each VIOS 106 collects health information from all of the VMs 102 in the respective VM group 112 that is assigned to the VIOS 106. For example, each VM agent 108 communicates health data for a respective VM 102 to an associated VIOS 106 describing the health of the respective VM 102, and the VIOS agent 110 receives this health data.

The health information may be a variety of types of health data. For example, the health data can include a periodic indicator referred to as a "heartbeat," which indicates that an associated VM 102 is running. Other examples of health data include an indication as to which applications are running on an associated VM 102, and a heartbeat for each application that is currently running on an associated VM 102. Each VM 102 may communicate this health data to an associated VIOS 106 according to a predetermined schedule. For example, and not by way of limitation, the health data may be communicated periodically at established intervals (e.g., every two seconds), or the health data may be continuously communicated in a data stream. It will be understood that various schedules may be used for the communication of this health data.

Each VIOS 106 receives health data from the VMs 102 in its respective VM group 112, and transmits or otherwise communicates the health data to the orchestrator 110. Each VIOS 106 may communicate the health data of its VMs 102 to the orchestrator 120 according to a predetermined schedule, which may be based on the schedule by which the health data is reserved from the VMs 102. For example, a VIOS agent 110 may transmit the health data of its associated VMs 102 to the orchestrator 120 periodically at established intervals, or that health data may be continuously communicated in a data stream. It will be understood that various schedules may be used for the communication of this health data.

In some embodiments, the health data in the SSP 114 (e.g., in the SSP database 118) is updated dynamically as the health of the VMs 102 changes. The health data may be updated in real time or near real time. For example, if a VM 102 transmits health data that would result in an update to the health data stored in the SSP database 118, the associated VIOS 106 detects the health data and transmits the health data in real time to the orchestrator 120, which updates the database 118 to incorporate the health data.

As noted above, the orchestrator 120 can access health information from any VIOS 106 regarding the VMs 102 associated therewith, and use the health data to make disaster recovery policy decisions. In some instances, the SSP database 118 and/or other components of the SSP 114 can become a single point of failure if the SSP 114 or components thereof go down or fail. Reasons for failure may include, e.g., pool disk problems, software problems (e.g., problems with Reliable Scalable Cluster Technology (RSCT), the pool file system becoming full, etc.). In such scenarios, the orchestrator 120 has no information regarding the health of the VMs 102 and thus can make incorrect disaster recovery decisions, as the orchestrator is not aware of updates to the health of the VMs 102.

In some embodiments, the system 100 includes one or more supplemental databases 122 for redundantly storing health information that is stored in the SSP 114 for each of the VMs 102 monitored by a VIOS 106. The one or more supplemental databases 122 are also referred to herein as one or more health information databases 122 or VIOS databases 122. A VIOS database 122 is provided for each VIOS 106 in the system 100 and is remote from the SSP 114, so that failures in the SSP 114 do not affect the health information stored in the VIOS database 122.

These embodiments address the challenges presented by conventional SSP systems, by permitting the recovery of health information in the event that health information in the SSP 114 becomes unavailable. Health information may become unavailable for a number of reasons, such as damage to or failure of the SSP 114 or components thereof, loss of data, etc. In such an event, the orchestrator 120 can retrieve health information from some or all of the VMs 102 and reconstruct the health information as needed.

In one embodiment, each VIOS database 122 is a local database that resides in a respective VIOS 106. The VIOS database 122 can be managed by, for example, a VIOS agent 110, to request and receive health information from each VM 102 in the VM group 112 associated with the respective VIOS 106. The VIOS agent 110 may also be used to communicate with the orchestrator 120 to facilitate the transfer of health information to the orchestrator 120. Although the VIOS databases 122 are shown as residing in respective VIOSs 106, they are not so limited and can be in any suitable location, such as in a cache residing on the host machine 104 or on a separate device.

Health information may be stored in a VIOS database 122 as a subset of the health data that is stored in the SSP 114. For example, when a VIOS 106 receives health data for a VM 102, the health data for that VM 102 is transmitted to the orchestrator 120, and a copy of the health data for that VM 102 is in one or more tables 124. The copy of the health data can be stored as any suitable data structure and is thus not limited to one or more tables 124. For example, the copy of the health data may be stored in a database catalog of the database 118, and the health data is stored in a portion of the catalog that resides in the VIOS 106.

Figure 2:
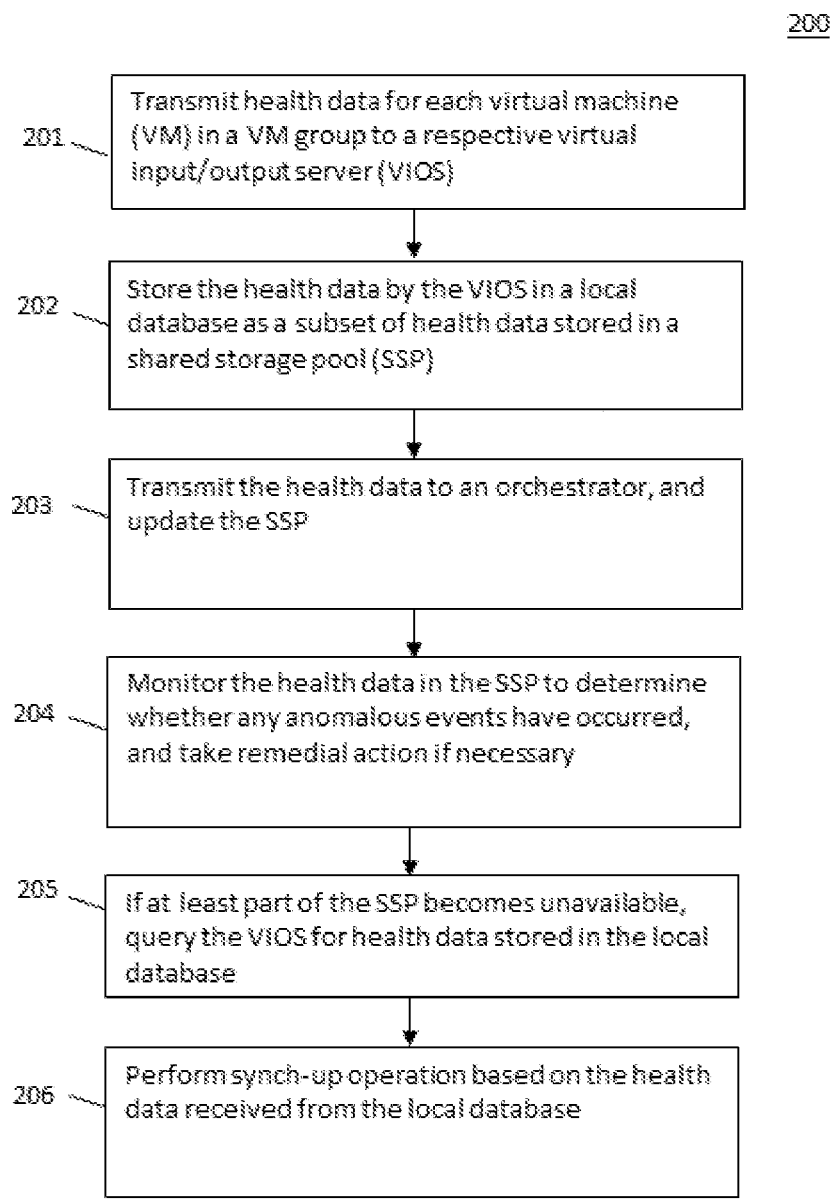
FIG. 2 is a flow diagram of a method of managing health information in a shared storage computing system, according to one or more embodiments of the present invention.

When there is an update in the health data for a given VM 102, the VIOS 106 managing the given VM 102 updates the appropriate data in the SSP 114 and, in parallel (e.g., simultaneously), updates the copy of the health data in an associated VIOS database 122. In one embodiment, when a VIOS 106 updates data in the SSP 114 for a VM 102, the VIOS 106 also updates one or more entries in table 124 associated with the VM 102. For example, FIG. 2 illustrates an embodiment of a method 200 of managing health information in a shared storage computing system. The method 200 may be performed by a processor, OS or other suitable application or program. Although the method 200 is discussed in conjunction with the system 100, the method 200 is not so limited. The method 200 is discussed in conjunction with blocks 201-206. The method 200 is not limited to the number or order of steps therein, as some steps represented by blocks 201-206 may be performed in a different order than that described below, or fewer than all of the steps may be performed.

At block 201, each VM 102 transmits health data to a respective VIOS 106. Transmission of the health data to the VIOS 106 may occur periodically or as needed. For example, each VM 102 periodically reports an indication (e.g., a "heartbeat") as to whether the VM 102 is running properly, and/or reports an indication as to which applications in the VM 102 are currently running.

At block 202, the VIOS 106 stores the received health data in its respective VIOS database 122, which in one embodiment is a local database residing in the VIOS 106. For example, when the VIOS 106 receives health data, appropriate entries in table 124 in the respective database 122 are updated or created. The received health data is stored in the respective database 122 a subset of the health data stored in the SSP 114.

At block 203, the VIOS 106 transmits the health data of its associated VMs 120 to the orchestrator 110, and the orchestrator 110 updates the SSP database 118 with the transmitted health data.

At block 204, the orchestrator 110 monitors the health data in the SSP 114 to determine whether any of the VMs 102 are operating outside expected parameters and/or whether any anomalous events occur (e.g., the SSP 114 fails). If necessary, the orchestrator 110 can take remedial action.

For example, the orchestrator 110 may have access to a set of established policies that set operating parameters (e.g., thresholds) for the health data. The orchestrator 110 may compare the health data of each VM 102 to these policies to determine whether the health data falls within expected operating parameters. If a VM's health data falls outside the expected operating parameters, then the orchestrator 110 may deem the VM 120 to be operating anomalously. As a result, the orchestrator 110 may initiate a remedial action. Remedial actions include, for example, querying the VM 102 or its associated VIOS 106 for additional health information, allocating additional resources to the VM 102, restarting one or more applications on the VM 102, restarting the VM 102, restarting an application on a different VM 102, taking the VM 102 offline, and/or notifying an administrator of a detected anomaly.

At block 205, if all or a part of the SSP 114 fails or health data in the SSP 114 is otherwise unavailable, the orchestrator 120 queries one or more VIOSs 106 and retrieves the health data for one or more VMs. Upon receipt of such a query, a VIOS 106 will retrieve health data stored in its respective VIOS database 122 and transmit the retrieved data to the orchestrator 120.

In one embodiment, the orchestrator 120 queries each of the VIOSs 106 for the health data associated with each of the VMs 102 that the VIOS 106 manages. The orchestrator 120 may consolidate the health data from some or all of the VMs 102 to reconstruct all or part of the health data that was previously stored in SSP 114, or to otherwise get a consolidated view of the health of the system 100. It is noted that in some cases, the health status of one or more VMs 102 changes after the SSP 114 failure. In such cases, reconstructing the health data does not result in an identical set of data. Instead, where appropriate, the reconstructed health data is updated data that reflects the current state of all or some of the VMs 102.

This fault tolerant approach of using dual databases (e.g., the SSP database 118 and the various VIOS databases 122) to get health information ensures that the orchestrator 120 has a view of VM health at all times to make an informed policy decision. Once the SSP database 118 is back online, the orchestrator 120 can use the VIOS databases 122 to quickly recover and perform appropriate synch-up operations.

AT block 206, when the SSP 114 comes back online or otherwise becomes available, the orchestrator 120 may perform a synch-up operation. The synch-up operation includes gathering health data from all of the VIOSs 106 and updating the SSP database 118 accordingly. This allows for a relatively quick sync-up, in that the health data can be quickly recovered and synchronized without having to individually query each VM 102.

Figure 3:
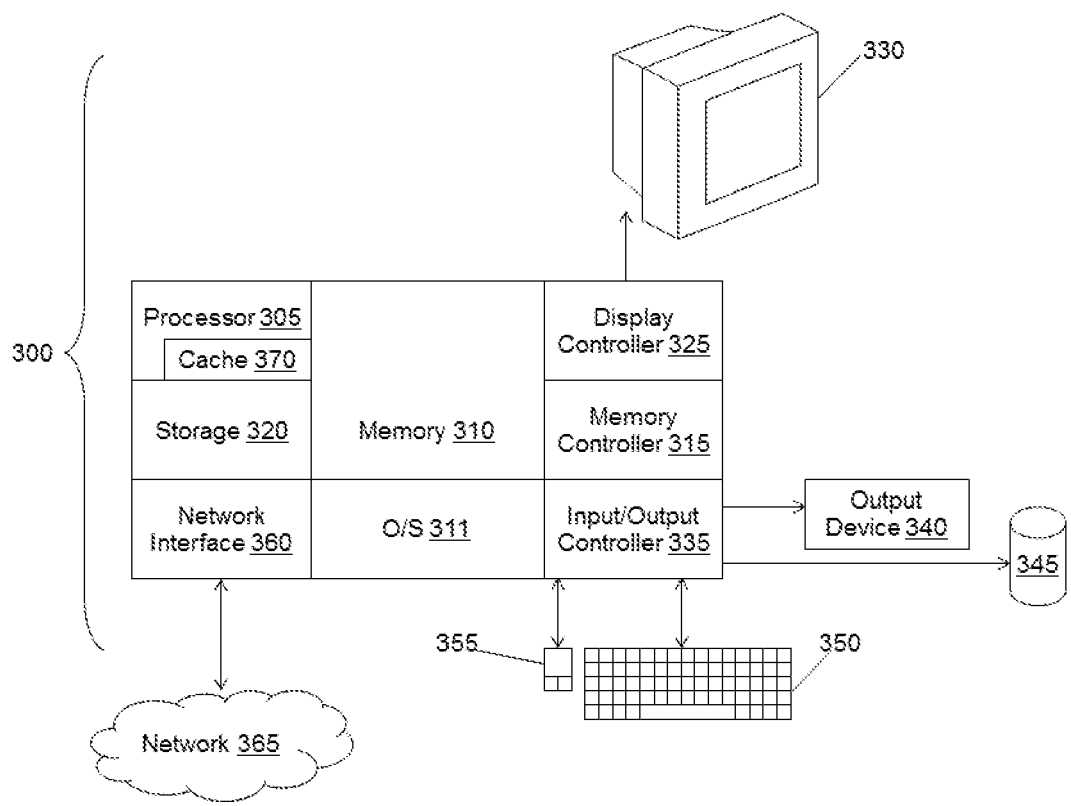
FIG. 3 is a diagram of a computer system for implementing some or all aspects of one or more embodiments of the present invention.

FIG. 3 is a diagram of a computer system 300 for implementing some or all aspects of the system 100, according to some embodiments of this invention. The systems and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For example, and not by way of limitation, the orchestrator 120 may be implemented as one or more computer systems 300 or portions thereof, and each of the VIOSs 106 and the VMs 102 may run on one or more computer systems 300 or portions thereof.

In some embodiments, as shown in FIG. 3, the computer system 300 includes a processor 305, a memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the remediation systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

An embodiment of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
  a plurality of virtual machines (VMs);
  a shared storage pool (SSP) configured to store health information for the plurality of VMs;

a plurality of virtual input/output servers (VIO Ss) participating in the shared storage pool (SSP), wherein each VIOS is associated with a respective group of VMs of the plurality of VMs and is configured to receive health data for each VM of the respective group of VMs; and a health information database associated with each VIOS of the plurality of VIOSs, the health information database configured to store a subset of the health data for each VM of the respective group of VMs, wherein each VIOS is configured to transmit the health data for each VM of the respective group of VM to the SSP, and in parallel, store the subset of the health data in the health information database.

2. The system of claim 1, wherein the subset of the health data is a copy of at least a portion of the health data stored in the SSP.

3. The system of claim 1, wherein the health information database is a local database that resides on each VIOS.

4. The system of claim 1, further comprising an orchestration node configured to monitor the VMs and manage the health data stored in the SSP.

5. The system of claim 4, wherein each VIOS is configured to periodically receive the health data for each VM of the respective group of VMs, and in response transmit the received health data to the orchestration node and store the subset of the health data in the health information database.

6. The system of claim 4, wherein the orchestration node is configured to query each VIOS and receive the subset of the health data in response to a failure of at least part of the SSP.

7. The system of claim 6, wherein the orchestration node is configured to consolidate the health data received from each VIOS to reconstruct at least part of the health data that was stored in the SSP.

8. The system of claim 6, wherein the orchestration node is configured to synchronize the plurality of VIOSs and the plurality of VMs based on the health data retrieved from the health information database.

9. A method of managing a shared storage environment, the method comprising:

monitoring the shared storage environment, the shared storage environment including a plurality of virtual machines (VMs), a shared storage pool (SSP) configured to store health information for the plurality of VMs, and a plurality of virtual input/output servers (VIOSs) participating in the shared storage pool (SSP), wherein each VIOS is associated with a respective group of VMs of the plurality of VMs;

receiving health data for each VM of the respective group of VMs;

transmitting the health data for each VM of the respective group of VM to the SSP; and in parallel, storing a subset of the health data for each VM of the respective group of VMs in a health information database, the health information database associated with each VIOS of the plurality of VIOSs.

10. The method of claim 9, wherein the subset of the health data is a copy of at least a portion of the health data stored in the SSP.

11. The method of claim 9, wherein the health information database is a local database that resides on each VIOS.

12. The method of claim 9, further comprising managing the health data stored in the SSP by an orchestration node in communication with each VIOS, wherein each VIOS is configured to periodically receive the health data for each VM of the respective group of VMs, and in response transmit the received health data to the orchestration node and store the subset of the health data in the health information database.

13. The method of claim 12, further comprising querying each VIOS and receiving the subset of the health data by the orchestration node in response to a failure of at least part of the SSP.

14. The method of claim 13, further comprising consolidating, by the orchestration node, the health data received from each VIOS to reconstruct at least part of the health data that was stored in the SSP.

15. The method of claim 13, further comprising synchronizing the plurality of VIOSs and the plurality of VMs by the orchestration node based on the health data retrieved from the health information database.

16. A computer program product comprising a non-transitory computer readable storage medium having program instructions embodied therewith, the program instructions executable by a processing system to perform a method including:

monitoring a shared storage environment, the shared storage environment including a plurality of virtual machines (VMs), a shared storage pool (SSP) configured to store health information for the plurality of VMs, and a plurality of virtual input/output servers (VIOSs) participating in the shared storage pool (SSP), wherein each VIOS is associated with a respective group of VMs of the plurality of VMs;

receiving health data for each VM of the respective group of VMs;

transmitting the health data for each VM of the respective group of VM to the SSP; and in parallel, storing a subset of the health data for each VM of the respective group of VMs in a health information database, the health information database associated with each VIOS of the plurality of VIOSs.

17. The computer program product of claim 16, wherein the health information database is a local database that resides on each VIOS.

18. The computer program product of claim 16, wherein the method includes managing the health data stored in the SSP by an orchestration node in communication with each VIOS, wherein each VIOS is configured to periodically receive the health data for each VM of the respective group of VMs, and in response transmit the received health data to the orchestration node and store the subset of the health data in the health information database.

19. The computer program product of claim 18, wherein the method includes querying each VIOS and receiving the subset of the health data by the orchestration node in response to a failure of at least part of the SSP, and consolidating the health data received from each VIOS to reconstruct at least part of the health data that was stored in the SSP.

20. The computer program product of claim 19, wherein the method includes synchronizing the plurality of VIOSs and the plurality of VMs by the orchestration node based on the health data retrieved from the health information database.

* * * * *